Nov. 16, 1965 W. J. MATTHEWS 3,218,456
CONTROL SYSTEM FOR TRAINS
Original Filed Nov. 21, 1960 9 Sheets-Sheet 1

INVENTOR.
W.J. MATTHEWS
BY
HIS ATTORNEY

Nov. 16, 1965   W. J. MATTHEWS   3,218,456
CONTROL SYSTEM FOR TRAINS
Original Filed Nov. 21, 1960   9 Sheets-Sheet 4

FIG. 4B.

INVENTOR.
W.J. MATTHEWS
BY
HIS ATTORNEY

Nov. 16, 1965   W. J. MATTHEWS   3,218,456
CONTROL SYSTEM FOR TRAINS
Original Filed Nov. 21, 1960   9 Sheets-Sheet 5

FIG. 5A.

INVENTOR.
W. J. MATTHEWS
BY
Forest B. Hitchcock
HIS ATTORNEY

FIG. 6A.

Nov. 16, 1965    W. J. MATTHEWS    3,218,456
CONTROL SYSTEM FOR TRAINS
Original Filed Nov. 21, 1960    9 Sheets-Sheet 9

FIG. 6B.

WHEN SPEED IS REDUCED BELOW 12 M.P.H. STEPPING CEASES AND THERE IS NO FURTHER CHANGE IN FUEL SUPPLIED

*INVENTOR.*
W.J. MATTHEWS
BY
HIS ATTORNEY

United States Patent Office 3,218,456
Patented Nov. 16, 1965

3,218,456
CONTROL SYSTEM FOR TRAINS
William J. Matthews, Rochester, N.Y., assignor to General Signal Corporation, a corporation of New York
Continuation of application Ser. No. 70,887, Nov. 21, 1960. This application June 18, 1965, Ser. No. 467,818
18 Claims. (Cl. 246—187)

This application is a continuation of my prior application Ser. No. 70,887, filed November 21, 1960, which was in turn a continuation-in-part of my prior application Ser. No. 851,896, filed November 9, 1959, both of these prior applications being now abandoned.

This invention relates to control systems for trains, and it more particularly pertains to the selective remote control from a control office or manual control by push buttons of a locomotive and dump cars operating between points of loading and unloading.

Although it will be readily apparent as the description of the invention progresses that the remote control organization provided by the present invention is applicable wherever it is found desirable to control a railway locomotive, or other vehicle, remotely from a control office or wayside control point. One situation where the present invention is particularly useful is in the operation of a train for shuttle movements between a gravel pit where dump cars in the train are loaded, and a conveyor built over which the cars may be dumped individually by remote control.

In the system provided by the present invention, control codes are communicated from the control office to the locomotive by carrier current, or other suitable form of space radiation, modulated with selected tones indicative of distinctive forward, reverse, stop, dump or high or low speed controls. A system for checking integrity of the control system checks before the execution of each control code transmitted that the carrier and all of the tones can be received on the locomotive, and that the receiving equipment is also properly responsive to the interruption at the control office of the transmission of all of the tones and of the carrier.

The system according to the present invention employs a stepping switch on the locomotive in combination with a speed governor for throttle control. The stepping switch is operable, subject to limiting control by the governor and the tones received from the control office, to step up or down to respectively increase or decrease the speed of the locomotive step by step at timed intervals. When the desired speed is reached, as registered by the governor, the stepping ceases at the proper throttle setting to maintain normal speed for the particular speed range that has been designated and for the present grade condition of the trackway. If the grade, or other factors effecting the speed of the locomotive, changes as the locomotive progresses, the governor is effective to step up or step down the throttle control stepping switch as required in order to maintain the speed of the locomotive within a predetermined designated low or medium speed range.

The locomotive can be selectively rendered responsive either to remote controls as has been described, or it can be operated in accordance with the manual designation by an operator of neutral, forward, reverse, slow and fast controls by the actuation of push buttons, for example, belonging to these control designations. An automatic-manual control switch selects between remote and manual types of control on the locomotive. If the locomotive is operated in accordance with controls designated by actuation of the push buttons on the locomotive, the stepping switch is automatically operated as required to maintain the particular speed that has been designated by the actuation of a speed designating push button.

An object of the present invention is to employ a self-propelling stepping switch organization to progressively increase or decrease the flow of fuel to a locomotive power unit in time spaced steps.

Another object of the present invention is to selectively operate the stepping switch to step up or down, one step at a time, to respectively increase or decrease the flow of fuel to the locomotive power unit.

Another object of the present invention is to employ an axle driven speed governor on the locomotive to govern the rate and direction of stepping of the stepping switch to maintain a predetermined speed for the locomotive.

Another object of the present invention is to employ a speed governor in combination with the stepping switch organization to maintain the speed of a locomotive between predetermined high and low speed limits.

Another object of the present invention is to check the integrity of the locomotive apparatus to receive all tones and the carrier from the control office and to check the integrity of the receiving apparatus to detect the removal of all tones and the carrier prior to the reception of a control code for operation of the locomotive.

Another object of the present invention is to provide means on the locomotive for automatically maintaining continuously any one of a plurality of speeds that may be manually designated.

Another object of the present invention is to provide for the push button designation on a locomotive of operating controls for the locomotive.

Another object of the present invention is to render the locomotive selectively operable either by remote control or by control from manually operable push buttons on the locomotive.

Other objects, purposes and characteristic features of the present invention will be in part obvious from the accompanying drawings and in part pointed out as the description of the invention progresses.

In describing the invention in detail, reference is made to the accompanying drawings wherein.

For the purpose of simplifying the illustrations and facilitating in the explanation thereof, the various parts and circuits constituting this embodiment of the present invention have been shown diagrammatically and certain conventional illustrations and block diagrams have been employed, the drawings having been made more with the purpose of facilitating the disclosure of the present invention as to its principles and mode of operation rather than for the purpose of illustrating a specific construction and arrangement of parts that would be employed in practice. Thus, various relays and their contacts are illustrated in a conventional manner and symbols (+) and (−) are used to indicate the connections to terminals of batteries or other sources of direct current.

Figure 1:
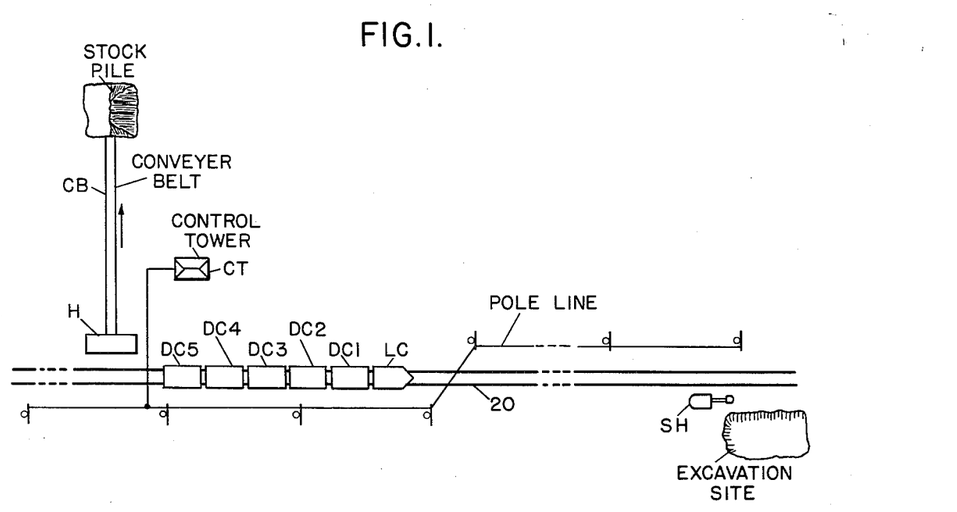
FIG. 1 is a plan view of a track layout for which one embodiment of the present invention may be employed.

With reference to FIG. 1, one embodiment of the present invention has been illustrated as applied to the remote control of a locomotive LC having coupled thereto dump cars DC1, DC2, DC3, DC4 and DC5 respectively constituting a train operating on a stretch of railway track 20 between an excavation site at which a shovel SH is located, and a conveyer belt CB upon which material which has been excavated is dumped from the cars and conveyed to a stock pile or other facility.

A control tower CT is provided near the point where the cars are dumped onto the conveyer belt, and this tower houses a suitable control machine CM (see FIG. 2) from which an operator can completely control the train remotely, both for forward and reverse operations at selected low and medium speeds and to dump the cars respectively into a hopper H feeding the conveyer belt CB. Controls are communicated to the locomotive via carrier current applied to a pole line along the trackway, but it is to be understood that radio communication could as well be used in accordance with the requirements of practice. The operator in the control tower spots the cars as required for filling from the shovel SH, either by having the train in direct view, or by radio communication directions (not shown) from the operator of the shovel, if the point of excavation is out of sight of the operator at the control tower.

Figure 2:
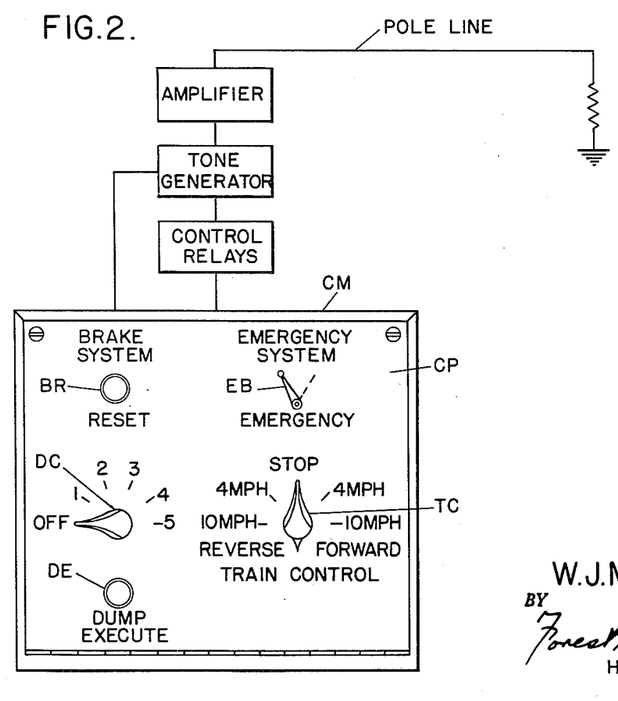
FIG. 2 is a view of a control panel and control apparatus shown by block diagram for the transmission of controls to the locomotive from the control office.
Figure 3:
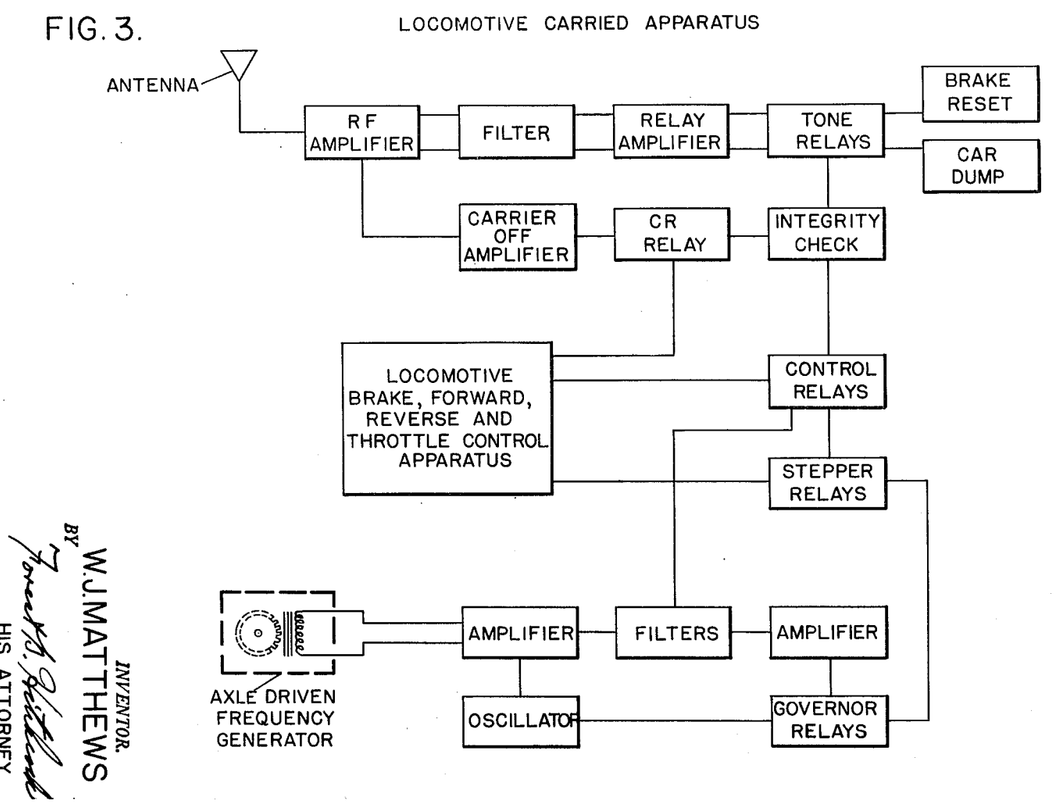
FIG. 3 is a block diagram of locomotive carried apparatus for one embodiment of the present invention.

With reference to FIG. 2, a block diagram shows the organization of the control transmitting apparatus at the control tower wherein a control machine CM is provided having a control panel CP upon which are disposed various control switches for designation by an operator of the controls to be communicated to the locomotive LC. A multiple position train control switch TC is provided on the control panel for the manual designation of forward and reverse and stop controls to be transmitted to the locomotive as well as for the designation of low and medium speeds for operation in either direction. The center position of the switch TC is used for designation of a stop control, the right-hand positions of the lever TC are used for designation of low and medium forward speeds and the left-hand operated positions of the lever TC are used for designation of low and medium reverse speeds.

A multiple position dump control switch DC is also provided on the control panel having a normal off position when the lever is in its extreme left-hand operated position, and having numbered positions corresponding to the numbers of the dump cars drawn by the locomotive LC. Associated with the dump control switch DC is a dump execution push button DE, which when depressed causes execution of the dump control to dump the car that has been designated by the switch DC. This dump execution button is effective to maintain the designated car in its dump position as long as the button is maintained depressed, and to restore the car to its normal position upon the restoration of the dump execution button DE to its normal position.

Also disposed on the control panel CP is a brake reset button BR and an emergency brake switch EB. Actuation of the emergency brake switch EB to its right-hand position removes carrier energy normally transmitted to the locomotive LC and thus causes an emergency application of the brakes of the locomotive. The brakes of the locomotive are normally set by a service application whenever the train control switch TC is in its center position.

Figure 4A:
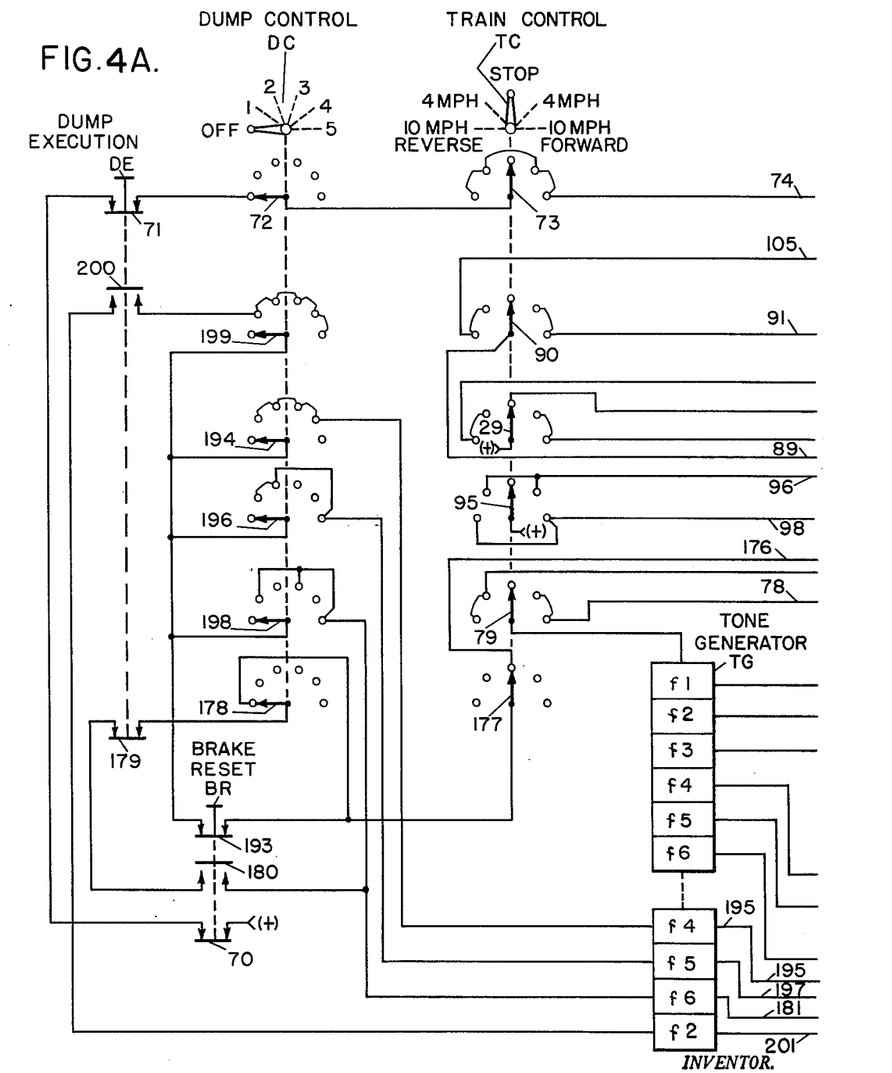
FIGS. 4A and 4B when placed side by side illustrate a detail circuit organization for the transmission of designated controls for the locomotive and dump cars from a control office.
Figure 4B:
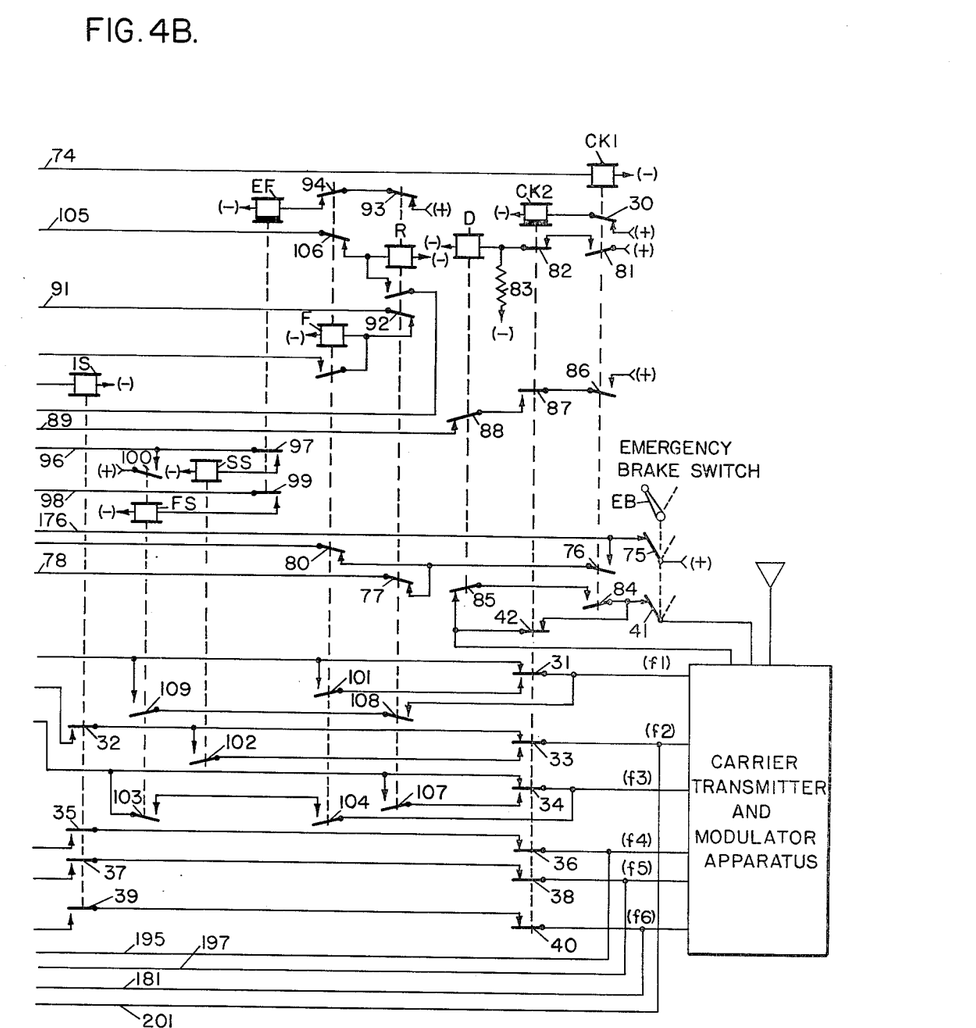

With reference to FIGS. 4A and 4B, a circuit organization is illustrated for the transmission of control codes selected in accordance with controls designated by actuation of the above described levers and buttons on the control panel CP. The codes are communicated by selected tones applied to a carrier generated by Carrier Transmitter and Modulator Apparatus illustrated in block form in FIG. 4B. The tones are generated by a tone generator TG also illustrated in block form in FIG. 4A wherein distinctive tone frequencies $f1$, $f2$, $f3$, $f4$, $f5$ and $f6$ are generated.

Check control relays CK1, CK2 and D are provided at the control office for the purpose of checking the integrity of the system, relays CK2 and D being made slow to drop away. Relays F and R are provided for selecting respectively forward and reverse control codes for transmission to the locomotive LC, and these relays have associated therewith a slow drop-away back contact repeater relay EF. Relays FS and SS are provided for selecting respectively medium and slow speed codes for transmission to the locomotive in accordance with the positions to which the train control switch TC is operated.

Figure 5A:
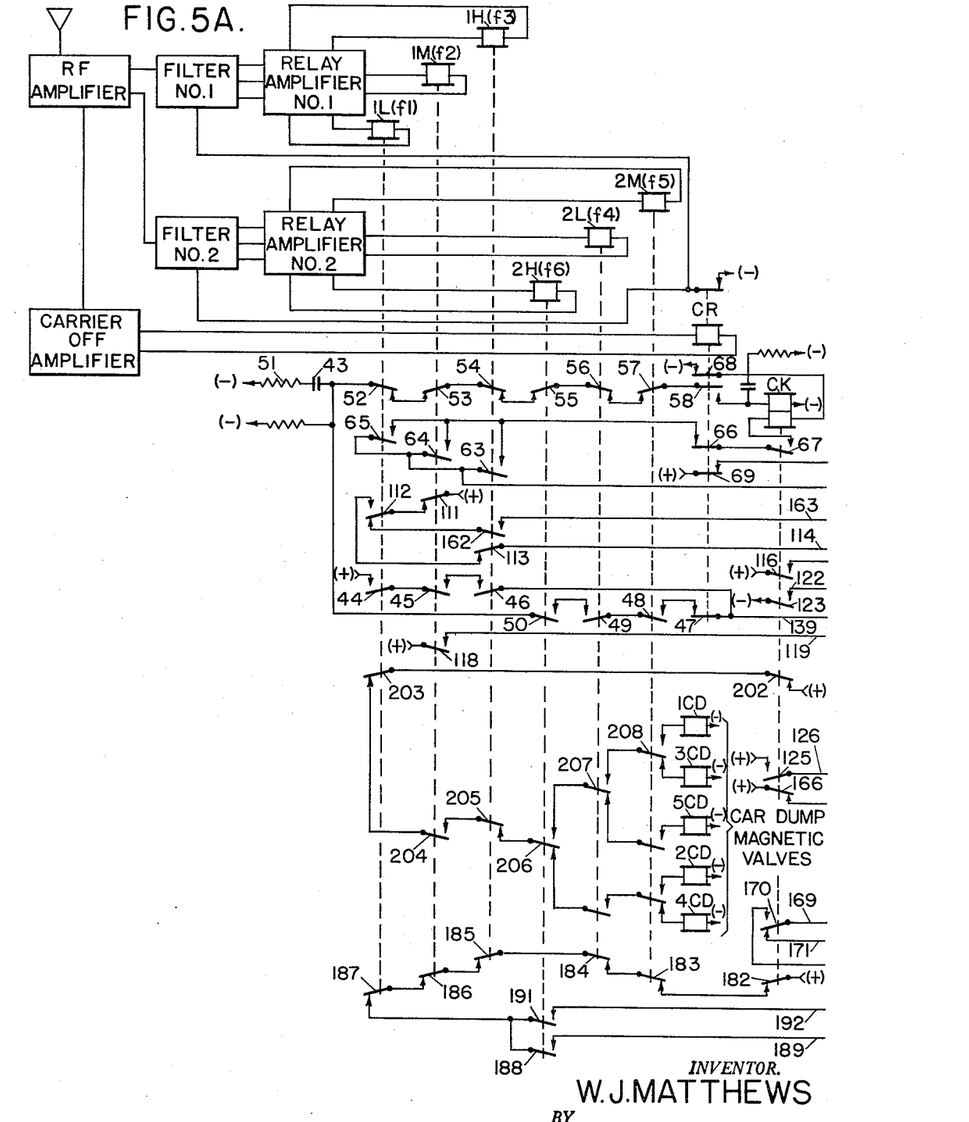
FIGS. 5A, 5B and 5C when placed side by side illustrate locomotive control apparatus for the control of a locomotive selectively by push-button operation or in accordance with control codes communicated from the control office.
Figure 5B:
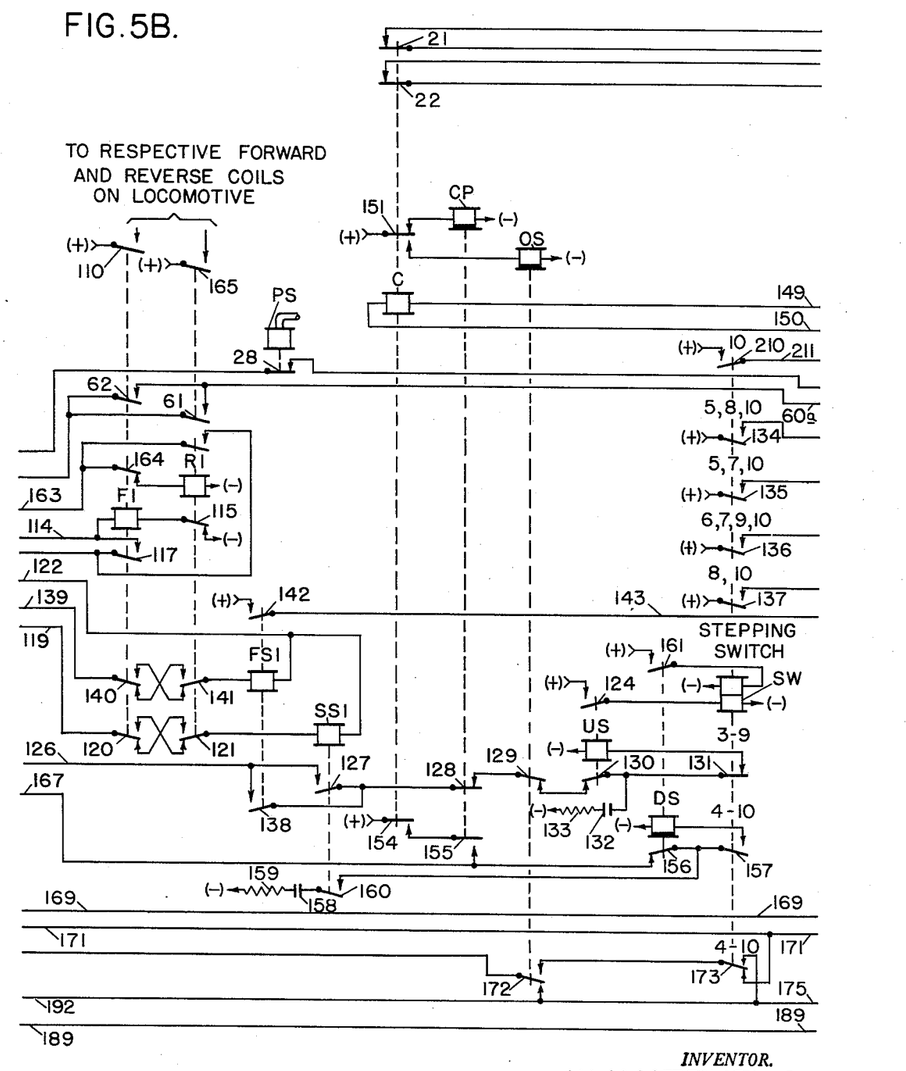
Figure 5C:
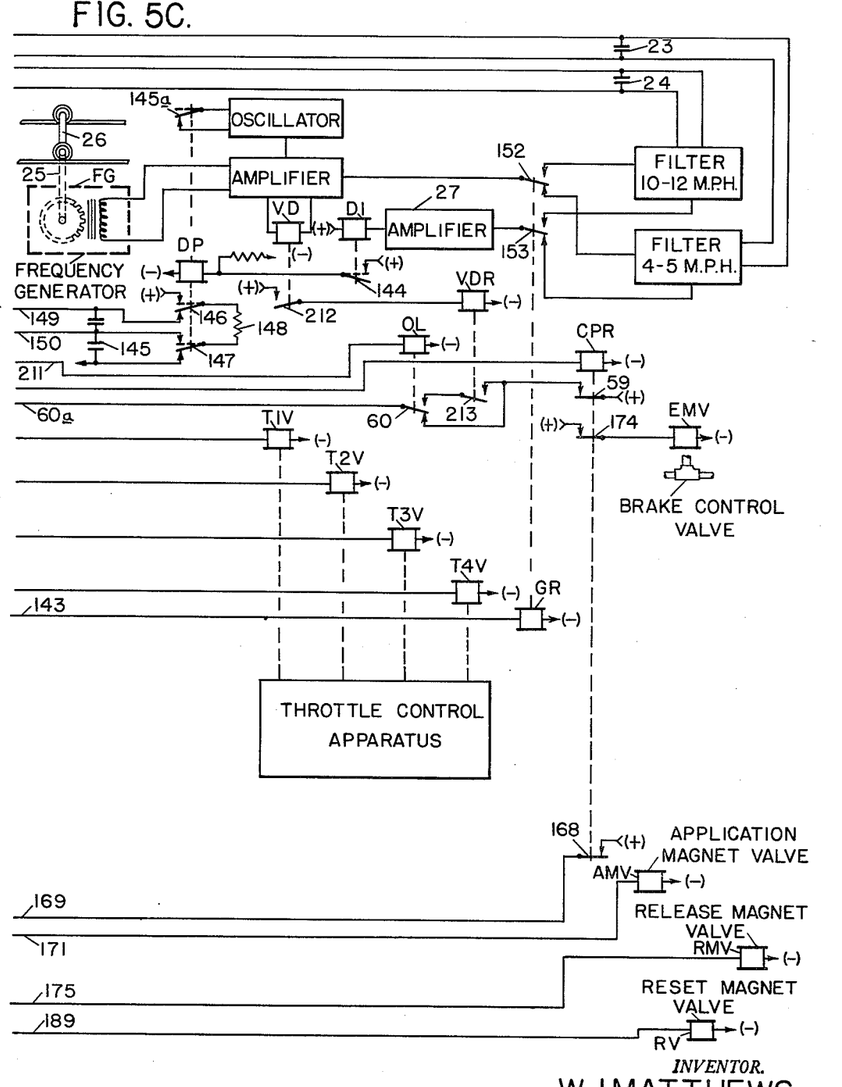
Figure 6A:
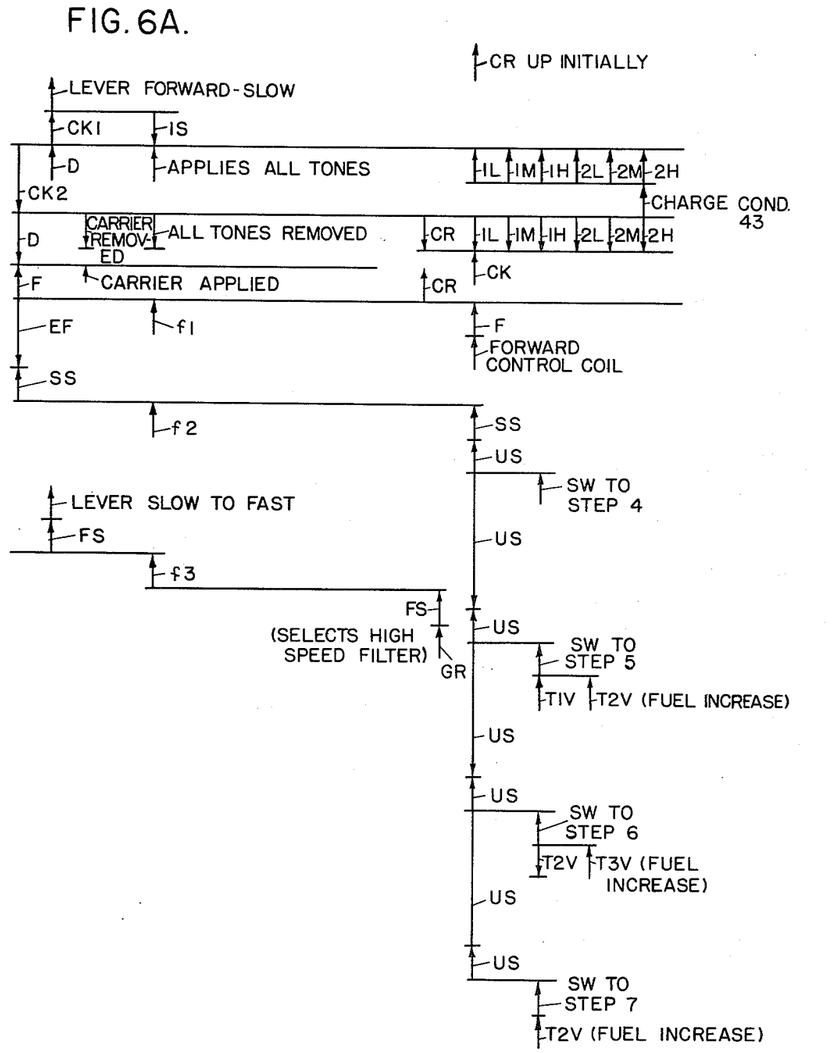
FIGS. 6A and 6B comprise a sequence chart illustrating the sequence of operation of certain of the devices of the system in response to the designation of a forward control for a remote controlled train.
Figure 6B:
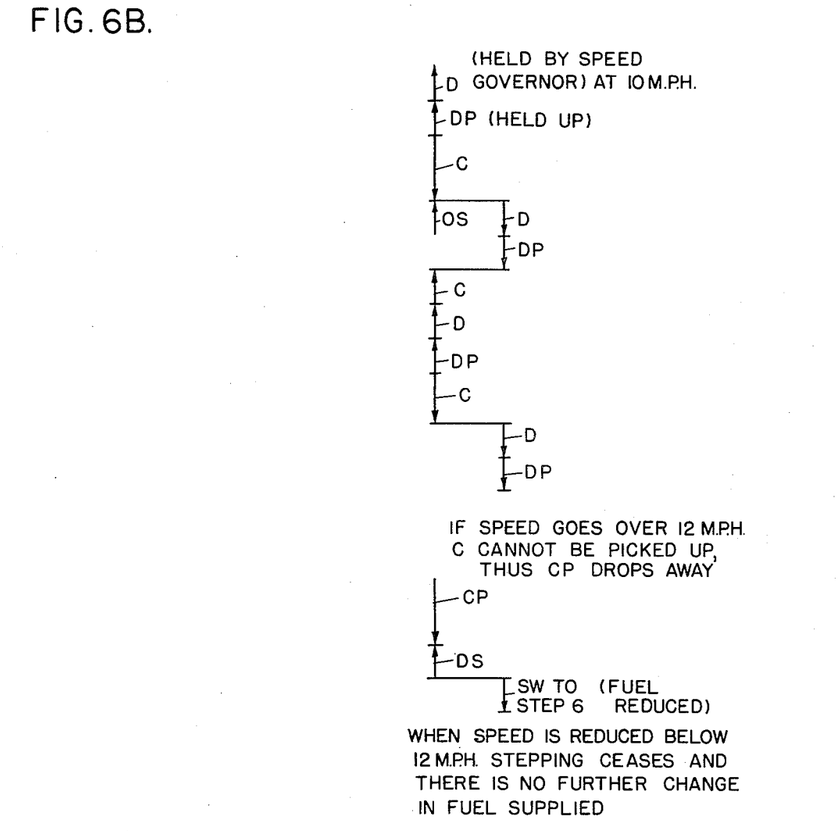

The locomotive carried equipment which is illustrated in FIGS. 5A, 5B and 5C comprises carrier receiving apparatus including an RF Amplifier, a Filter No. 1 and a Filter No. 2, Relay Amplifier No. 1, Relay Amplifier No. 2 and a Carrier Off Amplifier. Tone responsive relays 1L, 1M and 1H are provided to be responsive to the output of Relay Amplifier No. 1 in accordance with the reception of frequencies $f1$, $f2$ and $f3$ respectively. Similarly, the relays 2L, 2M and 2H are provided for responding to the output of Relay Amplifier No. 2 upon reception of frequencies $f4$, $f5$ and $f6$ respectively. A relay CR is provided for energization in response to the reception of carrier energy from the control office.

A check relay CK (see FIG. 5A) is provided on the locomotive for checking the integrity of the communication system. Relays F1 and R1 are provided on the locomotive to be responsive respectively to the reception of forward and reverse control codes, and relays SS1 and FS1 are provided for responding respectively to slow speed and medium speed control codes communicated from the control office.

Up-step and down-step control relays US and DS (see FIG. 5B) respectively are provided on the locomotive for governing the up and down stepping respectively of a suitable stepping switch SW. The stepping switch SW is of a type which is actuated upon energization of its up-step or down-step winding respectively, and, for this particular embodiment of the present invention, steps 3 through 10 of the stepping switch are employed, there being several decks of contacts to provide for the separate control of different circuits as illustrated during selected steps. The numbers over the stepping switch contacts indicate the steps during which the associated contact is closed. The various steps of the stepping switch SW are used to selectively control the fuel lines feeding to the locomotive power unit through the selective energization in different combinations of locomotive governor valves T1V, T2V, T3V and T4V. These valves can be considered as part of a locomotive governor generally known to those skilled in the art, such as is shown, for example, on page 27, section 101A, March 1952 of "Engineers Manual" by Fairbanks-Morse. The supply of fuel is increased to the power unit progressively on the different steps in accordance with the conditions of energization of the valves T1V, T2V, T3V and T4V as is shown in the following tabulation for the different steps.

| Step | T1V | T2V | T3V | T4V |
| --- | --- | --- | --- | --- |
| 4 | down | down | down | down |
| 5 | up | up | down | down |
| 6 | down | down | up | down |
| 7 | down | up | up | down |
| 8 | up | down | down | up |
| 9 | down | down | up | up |
| 10 | up | up | up | up |

A speed governor (see FIG. 5C) is provided on the locomotive comprising a frequency generator FG directly connected to one of the axles of the locomotive, an oscillator, an amplifier for amplifying the output of the frequency generator FG, a Filter 10–12 MPH, a Filter 4–5 MPH, and an amplifier for amplifying the output of the filters. The oscillator generates a frequency that is passed by the filters but the filters are effective to block frequencies generated by the frequency generator FG for speeds below the speeds for which the respective filters are provided. The Filter 4–5 MPH is normally effective to pass frequencies generated above four miles per hour in accordance with the closure of front contact 21 of a control relay C. When the control relay C is dropped away, the opening of contacts 21 renders capacitor 23 effective to increase the speed at which the Filter 4–5 MPH will pass energy from the frequency generator FG to five miles per hour. A similar organization is provided in connection with the Filter 10–12 MPH wherein selection is made by contact 22 as to whether or not the capacitor 24 is effective in the filtering circuit. It is to be understood that these selected speeds are only typical values and that the filters may be constructed to satisfy any speed requirements of practice.

A voltage detector relay VD and its associated relay VDR are provided for registering whenever voltage is generated by the frequency generator FG for the purpose of checking the integrity of the mechanical connection of shaft 25 of the frequency generator FG to the axle 26 of the locomotive.

Detector relays D1 and DP are provided for the normal energization of the control relay C as a result of the output of amplifier 27. Relays CP and OS are provided as slow acting front and back contact repeater relays respectively of the control relay C.

A carrier repeater relay CPR is provided for repeating the energized position of the carrier relay CR and for checking that there is air pressure on the locomotive as indicated by the closure of a contact 28 of a suitable pressure switch PS. A relay OL is provided for detecting an overload condition, and a relay GR is provided to select as to which one of the filters of the speed governor is to be rendered effective for the control of relay D1 in accordance with whether a low or medium speed control is received from the control office.

Brake control valves are provided on the locomotive for governing application of the brakes wherein valve EPV is provided for causing an emergency application of the brakes, application magnet valve AMV is employed in connection with a service application, release magnet valve RMV is provided for governing the release of the brakes of the locomotive and a reset magnet valve RV is provided for resetting purposes.

Car dump magnetic valves 1CD through 5CD are provided on the respective cars for controlling air supplied to the dump mechanisms of cars DC1 through DC5 respectively. These valves are connected by control wires to the locomotive LC.

A push button control panel P (see FIG. 5B) is provided on the locomotive for the manual designation of locomotive operating controls. On this panel P are disposed push buttons NPB, FPB, RPB, SSPB and FSPB for the designation respectively of neutral, forward, reverse, slow and fast speed operating controls. The push buttons PB are mechanically interlocked wherein the last actuated push button is maintained in its actuated position until the actuation of another push button PB which is effective to reset the prior actuated button. It is assumed that the neutral button NPB is normally in its actuated position as is illustrated in FIG. 5B, it being assumed that the locomotive is not in motion.

An automatic-manual control switch AM is provided for selectively rendering the operation of the stepping switch SW responsive either to remote control tones communication from the control office, or to the actuation of the push buttons PB on the push button control panel P on the locomotive. This switch AM is illustrated as being normally set in a position for the remote control of the locomotive.

Having thus described the general organization of one embodiment of the present invention, more detailed consideration of the circuit organization will now be given upon considering certain typical operating conditions.

OPERATION

In general, the tone frequencies $f1$, $f2$ and $f3$ are used to control the operation of the locomotive and the tone frequencies $f4$, $f5$ and $f6$ are used to control the dumping of the cars. Thus, the tone responsive relays 1L, 1M and 1H (see FIG. 5A) on the locomotive, corresponding to the frequencies $f1$, $f2$ and $f3$ respectively, are primarily for locomotive control and the relays 2L, 2N and 2H, corresponding to the frequencies $f4$, $f5$ and $f6$ respectively, are primarily for the control of the dumping of the cars.

Each time that a new forward or reverse control is designated for the locomotive, the carrier and all tones are momentarily transmitted and then the carrier and all tones are momentarily removed. It is checked on the locomotive by the check relay CK of FIG. 5A that the tone responsive relays 1L, 1M, 1H, 2L, 2M and 2H properly respond to the application of the tones, and are dropped away when the tones are removed. It is further checked on the locomotive by the carrier relay CR that the carrier is also removed momentarily. The transmission of all of the tones is effected at the control office in response to actuation of the train control lever TC to a forward or a reverse designating position upon the picking up of relay CK1 and the dropping away of the relay IS which is normally energized through contact 29 of lever TC in its center position. The relay CK2, which has been energized through back contact 30 of relay CK1 is deenergized by the picking up of relay CK1, but it is maintained picked up for a time because of its slow drop away characteristics.

Relay CK1 becomes picked up at this time by the energization of a circuit extending from (+), including normally closed contact 70 of brake reset push button BR (see FIG. 4A), normally closed contact 71 of dump execution button DE, contact 72 of dump control lever DC in its normal position, contact 73 of train control lever TC on its left-hand or right-hand operated position, wire 74, and winding of relay CK1, to (−). The picking up of this relay closes a circuit for application of energy to the tone generator TG extending from (−), including contact 75 of emergency brake switch EB in its left-hand position, front contact 76 of relay CK1, back contact 77 of relay R (if a forward control has been designated), wire 78, and contact 79 of train control switch TC in its right-hand position to the tone generator TG. If the train control lever TC is actuated to its left-hand position for designation of a reverse control, the circuit for energization of the tone generator includes back contact 80 of relay F rather than back contact 77 of relay R in series with contact 79 of train control lever TC in its left-hand position. It is to be understood that the above described contact selections can be used in other ways to render the tone generator TG effective, rather than for governing the application of energy to the tone generator, in accordance with the requirements of practice.

Frequency $f1$ of tone generator TG is applied to the carrier through front contact 31 of relay CK2; frequency $f2$ is applied to the carrier through back contact 32 of relay IS and front contact 33 of relay CK2; frequency $f3$ is applied to the carrier through front contact 34 of relay CK2; frequency $f4$ is applied to the carrier through back contact 35 of relay IS and front contact 36 of relay CK2; frequency $f5$ is applied from the tone generator TG to the carrier through back contact 37 of relay IS and front contact 38 of relay CK2; and frequency $f6$ is applied from the tone generator TG to the carrier through back contact 39 of relay IS and front contact 40 of relay CK2. The carrier is normally applied at the control office through contact 41 of the emergency brake switch EB in its left-hand position and through front contact 42 of relay CK2.

The application of the carrier and all tones to the output of the control office transmitter causes the relays 1L, 1M, 1H, 2L, 2M and 2H on the locomotive to become picked up through their associated filters. The carrier relay CR is normally in its picked up position. With all of the tone relays energized, together with the energization of the carrier relay CR, a circuit is closed to charge the capacitor 43 extending from (+) including front contacts 44, 45, 46, 47, 48, 49 and 50 of relays 1L, 1M, 1H, CR, 2M, 2L and 2H respectively capacitor 43 and limiting resistor 51, to (—).

When relay CK1 (see FIG. 4B) is picked up at the control office, relay D is picked up by the energization of a circuit extending from (+), including front contact 81 of relay CK1, front contact 82 of relay CK2, and winding of relay D, to (—). Relay D is made slow to drop away by the resistor 83 shunted across its winding. Upon the dropping away of relay CK2 after a time determined by its slow drop away characteristics, there is an interruption in the transmission of the carrier by the opening of front contact 42 of relay CK2 and thus the carrier and necessarily all of the tones has an interruption in its transmission. This interruption is of short duration, however, because the relay D is deenergized by the dropping away of relay CK2 upon the opening of front contact 82 and thus a circuit becomes closed after the relay D is dropped away to render the transmission of the carrier again effective. This circuit includes contact 41 of emergency brake switch EB in its left-hand position, front contact 84 of relay CK1, and back contact 85 of relay D.

Upon the removal of the carrier and the dropping away of all of the tone responsive relays on the locomotive, the check relay CK becomes picked up by the discharge of capacitor 43 through back contacts 52, 53, 54, 55, 56, 57 and 58 of relays 1L, 1M, 1H, 2H, 2L, 2M and CR respectively. The relay CK is made sufficiently slow in dropping away to be maintained picked up during the crossover time of the contacts of the relay CR upon the reception of a forward or reverse control, at which time a stick circuit is established in accordance with the control that has been designated so that the relay CK is maintained steadily energized while the designated control is effective. The stick circuit for relay CK extends from (+), including front contact 59 of carrier repeater relay CPR (see FIG. 5C), back contact 60 of overload relay OL, wire 60a, front contacts 61 and 62 of relays R1 and F1 respectively connected in multiple, front contacts 63, 64 and 65 of relays 1H, 1M and 1L respectively connected in multiple, front contact 66 of relay CR, front contact 67 of relay CK, wire 225, contact 226 of switch AM, wire 227, lower winding of relay CK, wire 228, contact 229 of switch AM, wire 230 and front contact 68 of relay CR, to (—). The carrier repeater relay CPR (see FIG. 5C) is in its picked up position at this time because of its energization through normally closed contacts 69, 235 and 28 of relay CR, switch AM and pressure switch PS respectively.

It will be readily apparent that should the check fail to have become complete so as to pick up any one of the tone relays or the carrier relay CR, or to have dropped these relays away after momentary energization, the check relay CK would not become picked up as has been heretofore described, and without the check relay CK being picked up, no controls can be executed on the locomotive other than controls for reducing speed and applying the brakes.

If it is assumed that a forward control is designated at the control office, the relay F (see FIG. 4B) becomes picked up, upon the dropping away of the relay D, after transmission of the check conditions above described. Relay F is energized at this time by a circuit extending from (+), including front contact 86 of relay CK1, back contact 87 of relay CK2, back contact 88 of relay D, wire 89, contact 90 of train control lever TC in its right-hand position, wire 91, back contact 92 of relay R, and winding of relay F, to (—). It will be readily apparent that energization of this circuit is maintained effective as long as a forward control remains designated by the lever TC being in either low or medium forward positions. The picking up of relay F causes the dropping away of relay EF which is normally energized through a circuit including back contact 93 of relay R, and back contact 94 of relay F. When relay EF becomes dropped away, a circuit is closed for the picking up of the slow speed relay SS or the medium speed relay FS, dependent upon the speed selected by the actuation of the train control lever TC in designating the forward control. If the low speed has been designated by actuation of the lever TC to the 4 m.p.h. forward position, the relay SS becomes picked up upon the dropping away of relay EF by the energization of a circuit extending from (+), including contact 95 of lever TC in the slow speed right-hand position, wire 96, back contact 97 of relay EF, and winding of relay SS, to (—). If the medium speed has been designated by actuation of the lever TC to the 10 m.p.h. forward position, relay FS is picked up by the energization of a circuit extending from (+), including contact 95 of lever TC, wire 98, back contact 99 of relay EF, and winding of relay FS, to (—). The picking up of relay FS causes the picking up of relay SS by the energization of a circuit extending from (+), including front contact 100 of relay FS, back contact 97 of relay EF, and winding of relay SS, to (—).

With the relay F picked up, the tone frequency $f1$ is selected for transmission upon the closure of front contact 101 of relay F, and with relay SS picked up, the frequency $f2$ is selected for transmission in accordance with the closure of front contact 102. If a medium speed has been designated together with a forward control, the frequency $f3$ is also transmitted because of the closure of front contact 103 of relay FS in series with front contact 104 of relay F in the tone selecting circuits.

Upon designation of a reverse control rather than a forward control, a similar mode of operation is effective except that the relay R is picked up rather than the relay F by the energization of a circuit including contact 90 of train control lever TC in a left-hand operated position, wire 105, back contact 106 of relay F, and winding of relay R, to (—). The picking up of relay R is effective to deenergize the relay EF by the opening of back contact 93, and the dropping away of relay EF provides for the selective energization of the relays SS and FS in a manner comparable to that which has been described.

The picking up of relay R selects the frequency $f3$ for transmission by the closure of front contact 107 in the tone selecting circuits, and the picking up of relay FS for a medium speed control in reverse provides for the transmission of frequency $f1$ in accordance with the closure of front contact 108 of relay R in series with front contact 109 of relay FS in the tone selecting circuit.

Although it will be apparent from the above described mode of operation that tone frequencies $f1$, $f2$ and $f3$ are transmitted where a medium speed is designated for either forward or reverse, it is to be understood that the tones selected by the forward and reverse relays F and R are transmitted first before the speed relays FS and SS can be energized through back contacts of the relay EF, and thus only the tone freqency $f1$ is transmitted initially for forward designation, and only the tone frequency $f3$ is transmitted initially for reverse direction designation.

Having thus described the mode of operation at the control office for the transmission of forward and reverse control codes, consideration will now be given to the reception of such controls on the locomotive with reference to FIGS. 5A, 5B and 5C. It has been pointed out that the designation of a forward control at the control office causes the transmission of the tone frequency $f1$. The reception of this frequency on the locomotive causes the picking up of the relay 1L (see FIG. 5A) and the picking up of this relay closes a circuit for the energization of the forward relay F1 (see FIG. 5B), which in turn closes front contact 110 to apply energy to the forward control coils on the locomotive, and thus initiate operation of the locomotive. The circuit by which relay F1 is picked up under these conditions extends from (+), including back contact 111 of relay 1H (see FIG. 5A), front contact 112 of relay 1L, back contact 113 of relay 1H, wire 114, contact 231 of switch AM, winding of relay F1, and back contact 115 of relay R1, to (−). The circuit just described for picking up of relay F1 is only momentarily closed because the relays 1M and 1H are selectively energized in accordance with the low or medium speed that has been designated. A stick circuit is closed, however, to maintain relay F1 picked up extending from (+), including front contact 116 of relay CK, front contact 117 of relay F1, winding of relay F1, and back contact 115 of relay R1, to (−).

If a slow speed forward control has been designated at the control office, the frequency $f2$ is transmitted after the forward relay F1 has had time to be picked up, and the reception of this frequency causes the picking up of relay 1M (see FIG. 5A) on the locomotive. Relay 1L is maintained picked up because of continued reception of the frequency $f1$ from the control office. Relay SS1 becomes picked up in response to the picking up of relay 1M by the energization of a circuit extending from (+), including front contact 118 of relay 1M, wire 119, contact 232 of switch AM, front contact 120 of relay F1, back contact 121 of relay R, winding of relay SS1, wire 122, and front contact 123 of relay CK, to (−). It will be noted in the circuit just described that the relay SS1 is picked up for either a forward or reverse control.

In accordance with the picking up of a speed relay such as the relay SS1, the operation of the stepping switch SW is initiated by the picking up of the up-step relay US to apply energy through its front contact 124 to the up-step winding of the stepping switch SW to operate that switch to step No. 4. The normal position of the stepping switch SW when a stop control is designated for the locomotive is at step No. 2. The circuit by which the relay US becomes energized under these conditions extends from (+), including front contact 125 of relay CK (see FIG. 5A), wire 126, front contact 127 of relay SS1, front contact 128 of relay CP, back contact 129 of relay OS, back contact 130 of relay US, contact 131 of stepping switch SW closed for steps 3–9, and winding of relay US, to (−). The energization of relay US also charges the capacitor 132 through limiting resistor 133, and because of this capacitor and resistor combination being shunted across the winding of relay US, the relay US is maintained picked up after its energization for a predetermined time interval, even though the relay opens its own pick-up circuit at back contact 130. The back contact 130 may be specially adjusted to remain closed during most of the crossover time of the relay US to provide the desired mode of operation. It will thus be seen by the circuit that has been described for the relay US that this relay will continue to pulse at timed intervals; and that each time the relay US is picked up, the closure of its front contact 124 is effective to actuate the stepping switch SW up one step so that the stepping switch SW is stepped successively at a predetermined rate, governed by the capacitor 132.

The initiation of forward movement of the locomotive is rendered effective upon the picking up of the forward relay F1 as has been described by the closure of front contact 110, and the stepping of the stepping switch from step 3 to step 4 provides no change in the fuel supply above that which has been applied by the picking up of the forward relay F1. When the stepping switch SW is actuated from step 4 to step 5, however, throttle control valves T1V, and T2V become energized upon the closure of contacts 134 and 135 respectively, of the stepping switch SW. This operation is in accordance with the tabulation heretofore provided illustrating the code combinations established on the different steps for progressively increasing the fuel supplied to the locomotive power unit as the stepping progresses. It is to be understood that the locomotive fuel governor could also be adjusted for the use of different control codes. For step 6, the valve T2V becomes deenergized because the contact 135 of the stepping switch SW is not closed during step 6 and valve T3V is energized through contact 136. During step 7, the valve T2V is again energized. For step 8, the valves T2V and T3V again deenergize, and the valve T4V becomes energized through contact 137. When step 9 is taken, the valve T1V becomes deenergized. If the stepping progresses to step 10, the valves T1V and T2V become energized, and the valves T3V and T4V remain energized to provide for the maximum throttle opening for governing the locomotive power unit.

It will be noted that front contact 138 of relay FS1 is connected in multiple with front contact 127 of relay SS1 in the control circuit for the relay US, and thus the relay US provides a pulsing operation when a medium speed control is received, the same as when a slow speed control is received. Thus, if a medium speed control is received from the control office, the relay FS1 becomes picked up in response to the reception of tones $f1$, $f2$ and $f3$, which provide for the energization of relays 1L, 1M and 1H, respectively. The circuit by which relay FS1 is picked up extends from (+), including front contact 44 of relay 1L, front contact 45 of relay 1M, front contact 46 of relay 1H, wire 139, contact 233 of lever AM, front contact 140 of relay F1, back contact 141 of relay R1, winding of relay FS1, wire 122, and front contact 123 of relay CK, to (−). Relay FS1 when picked up provides for the energization of relay GR (see FIG. 5C) which is provided for selecting either the Filer 4–5 MPH or the Filter 10–12 MPH for the control of relay D1. Relay GR is picked up by the closure of front contact 142 of relay FS1 (see FIG. 5B) over wire 143.

The increase in throttle for the locomotive provided by the stepping apparatus as has been described is limited by the locomotive speed governor in accordance with whether a low or medium speed control code has been received from the control office, in accordance with the grade of the track, and in accordance with other characteristics that may have a bearing upon the speed of the locomotive. In other words, the stepping switch provides for a periodic increase in throttle for the locomotive, and the speed governor provides a limitation to arrest the increase at a preselected speed.

The speed governor on the locomotive provides normally for the pulsing of the relay D1 and DP in accordance with energy feeding through a selected one of the filters from the oscillator. Relay D1 energizes relay DP through front contact 144, and relay DP in turn cuts off the oscillator by the opening of back contact 145a. As has been heretofore pointed out, the frequency of the oscillator is high enough to be passed by whichever one of the filters may be selected by the relay GR. The pulsing of relay DP provides for maintaining the relay C steadily picked up. This is accomplished by charging the capacitor 145 through front contacts 146 and 147 of relay DP, and discharging the capacitor 145 through limiting resistor 148 and through the winding of relay C over wires 149 and 150.

Relay C, when picked up, provides for the energization of the front contact repeater relay CP through front contact 151, and relay C when dropped away provides the energization of relay OS through back contact 151. If the relay GR is in its dropped away position because of receiving a low speed forward or reverse control code from the control office, the closure of back contacts 152 and 153 of this relay selects the Filter 4–5 MPH to be included in the control circuit for the detector relay D1. If the relay GR is picked up because of receiving a medium speed forward or reverse control code, the closure of its front contacts 152 and 153 selects the Filter 10–12 MPH for inclusion in the control circuit for the detector relay D1.

The organization of the speed governor is such that when the frequency generated by the frequency generator FG is greater than the frequency setting of the selected filter, the relay D1 is maintained steadily energized, thus causing its repeater relay DP to become steadily energized and to fail to intermittently charge and discharge the capacitor 145 through the winding of the relay C, thus permititng the relay C to become dropped away.

From the above described mode of operation of the speed governor, it will be readily apparent that as the speed of the locomotive increases, because of the throttle increases provided by the stepping, a point is reached where the relay D1 is maintained steadily energized by energy from the frequency generator FG passing through the selected filter. At this time, the relay C becomes dropped away, and in so doing increases the speed setting of the particular filter being used in the control of the relay D1 so that the filter is again effective to block energy from the frequency generator FG, provided the speed of the locomotive is below the high speed in the range indicated for the filter being used. For example, if a low speed control has been designated and a speed of four miles per hour is reached by the locomotive, relay D1 and its repeater relay DP become steadily energized, and relay C becomes dropped away. The dropping away of relay C opens front contact 21 shunting capacitor 23, and thus changing the setting of the Filter 4–5 MPH from four to five miles per hour so that energy from the frequency generator is again blocked by the Filter 4–5 MPH and the relays D1 and DP become dropped away, thus causing the picking up of relay C. Relay C, when picked up again, applies a shunt through front contact 21 across the capacitor 23 reducing the speed setting of the Filter 4–5 MPH to four miles per hour, thus causing the relays D1 and DP to again be held up (assuming train speed is still between four and five miles per hour) for a sufficient time to cause the release of relay C. In this manner the relay C becomes pulsed for the speed range of the locomotive corresponding to that designated for the filter which is selected by the relay GR as being used in the control of the relay D1.

In accordance with the pulsing of relay C, the slow drop away relays CP and OS are both maintained picked up, and the relay OS in picking up causes cessation of the operation of the up-step relay US by the opening of back contact 129. When relay US fails to pulse, the stepping of the stepping switch SW ceases, and thus there is no increase in the throttle setting for the locomotive.

If the locomotive continues to increase its speed so that it exceeds the higher speed limit for the speed range designated, the relay C becomes steadily deenergized and thus the front contact repeater relay CP becomes dropped away. With the relays C and CP both in their dropped away positions, a circuit is closed for the down-step relay DS to progressively decrease the throttle setting by a mode of operation somewhat comparable to that which has been described for an increase in the throttle setting. The circuit by which relay DS is energized under these conditions extends from (+), including back contact 154 of relay C, back contact 155 of relay CP, back contact 156 of relay DS, contact 157 of stepping switch SW closed in any one of the steps 4–10 and winding of relays DS, to (—). The energization of this circuit also charges the capacitor 158 through limiting resistor 159 and through front contact 160 of relay SS1 so that upon the relay DS opening its own circuit at back contact 156, the capacitor 158 is effective to maintain the relay DS energized for a predetermined time to govern the rate of down-step of the stepping switch SW. The picking up of relay DS causes a down-step of the stepping switch SW by the closure of front contact 161 for energization of the upper winding of the stepping switch SW. The stepping switch SW steps one step down each time this winding is energized.

Upon the reduction in the throttle setting for the locomotive power unit, the speed of the locomotive becomes reduced, and when the speed as indicated by the governor is reduced below the top speed setting of the filter that is selected by the relay GR, the relay C again is restored to a pulsing condition, and thus provides for the energization of the relay CP. When relay CP becomes picked up, the circuit described for the energization of the down-step relay DS becomes opened at back contact 155, and thus the stepping of the stepping switch SW ceases. The up-step relay US is maintained deenergized at this time by the back contact 129 of relay OS being maintained open.

From the above described mode of operation, it will be readily apparent that a similar mode of operation is effective if the operator calls for a reduction of speed by operating the train control lever TC (see FIG. 4A) from a medium speed position to a slow speed position at a time when the locomotive is operating at medium speed. The reduced speed designation causes the dropping away of relay FS1 on the locomotive, and this in turn causes the dropping away of relay GR (see FIG. 5C) by opening its circuit at front contact 142 of relay FS1 (see FIG. 5B).

Relay GR, when dropped away, selects Filter 4–5 MPH instead of Filter 10–12 MPH in the control circuit for relay D1. This causes the dropping away of relay C (if the locomotive speed exceeds five miles per hour), which in turn causes the dropping away of relay CP. With relays C and CP both dropped away, the down-step relay DS becomes intermittently actuated by a mode of operation that has been described to cause the down-stepping of stepping switch SW. The down-stepping of the stepping switch SW is effective to cause a reduction in the fuel supplied to the locomotive power unit, and thus is effective to reduce the speed of the locomotive step by step until the speed is within the range 4–5 m.p.h. When this range is reached, the relay C becomes pulsed by a mode of operation that has been described, and the pulsing of this relay picks up the slow drop away relay CP by the closure of front contact 151, and thereby causes cessation of the down-stepping by opening the circuit for relay DS at back contact 155. Thus the stepping ceases, and the throttle is again increased or decreased by up-stepping or down-stepping in case the speed range 4–5 m.p.h. is penetrated either on the down or up side.

Having thus considered the mode of operation in detail for forward operation, it is to be understood that a similar mode of operation is provided for a reverse operating control, except that the reverse control relay R1 (see FIG. 5B) on the locomotive is picked up upon designation of a reverse control in accordance with the transmission of frequency f3 from the control office. The circuit by which relay R1 is picked up under these conditions extends from (+) including back contacts 111 and 112 of relays 1M and 1L respectively (see FIG. 5A), front contact 162 of relay 1H, wire 163, contact 234 of switch AM, back contact 164 of relay F1 and winding of relay R1, to (—). The closure of front contact 165 of relay R1 initiates operation of the locomotive in a reverse direction. As has been pointed out, the speed control system is effective in the same manner for reverse operation as has been described for forward operation.

If the operator at the control office designates a stop control for the locomotive by actuating the train control switch TC to its center position, all tones are removed, but the carrier continues to be transmitted. This condition provides for a service application of the brakes of the locomotive, and causes a rapid down-step operation of the stepping switch SW. The down-step relay DS is energized under these conditions by a circuit extending from (+) including back contact 166 of relay CK, wire 167, back contact 156 of relay DS, front contact of stepping switch SW closed for steps 4–10, and winding of relay DS, to (—). Relay DS when picked up causes the down stepping of the stepping switch SW, but the relay DS is not maintained picked up by capacitor 158 as has been heretofore described because of front contact 160 of relay SS1 being open as a result of removal of all of the tone frequencies from the carrier. Thus the relay DS drops out quickly upon the opening of its back contact 156, and is actuated repeatedly at frequent intervals to down step the stepping switch SW quickly until the stepping switch SW is restored to its normal position on step No. 3. Relay DS is shown as having some slow drop away characteristic to insure that it will be maintained picked up long enough to actuate the stepping switch SW.

Upon designation of a stop control by the operator at the control office, in addition to restoration to normal conditions of the stepper as has been described, a service application of the brakes is rendered effective on the locomotive in accordance with the transmission of a carrier with the check relay CK on the locomotive in its deenergized position. It will be noted that the check relay CK is maintained energized during a forward or a reverse control because of energization of one of the relays 1L, 1M or 1H. Upon actuation of the train control lever TC at the control office to a stop position, all tone frequency energy governing the relays 1L, 1M and 1H is removed, and thus the relay CK on the locomotive becomes dropped away. The dropping away of relay CK provides for a service application of the brakes by the energization of the application magnet valve AMV (see FIG. 5C). The circuit by which the valve AMV is energized extends from (+) including front contact 168 of carrier repeater relay CPR, wire 169, back contact 170 of relay CK, wire 171, and winding of application magnet valve AMV, to (−). The energization of valve AMV provides for a service application of the brakes.

Another condition where service application of the brakes is made is a condition of over-speed wherein the over-speed relay OS has been picked up as has been heretofore described, provided that the stepping switch SW is on a step below step 5. The circuit by which the application magnet valve AMV is energized at this time extends from (+), including front contact 168 of relay CPR, wire 169, front contact 170 of check relay CK, front contact 172 of relay OS, back contact 173 of stepping switch SW closed for step 3, wire 171 and winding of application magnet valve AMV, to (−).

An operator at the control office can also cause an emergency application of the brakes by actuation of the emergency brake switch EB (see FIG. 4B) on the control panel to its right-hand position. Such actuation removes the carrier upon the opening of contact 41 and causes the dropping away of the carrier off release CR (see FIG. 5A) on the locomotive. The dropping away of this relay is effective by the opening of its front contact 69 to cause the dropping away of relay CPR (see FIG. 5C) and the dropping away of this relay causes the deenergization of an emergency magnet valve EMV by the opening of front contact 174. The deenergization of valve EMV provides for an emergency application of the brakes of the locomotive irrespective of the condition of the magnetic valves AMV and RMV.

It will be readily apparent from the above description that the brakes of the locomotive are normally applied in accordance with the train control lever TC at the control office being normally in its center position as is illustrated in FIG. 4A. Thus each time a forward or a reverse control is designated, it is necessary to energize release magnet valve RMV (see FIG. 5C) in order to release the brakes. The valve RMV is then maintained energized as long as the forward or reverse control continues to be effective, except under conditions where the above described service application is rendered effective. The circuit by which the release magnet valve RMV is energized when a forward or reverse control is designated extends from (+), including front contact 168 of relay CPR, wire 169, front contact 170 of relay CK, back contact 172 of relay OS, wire 175, and winding of magnet RMV, to (−). In case the over-speed relay OS is picked up, and the stepping switch is on any one of the steps 4–10 the release magnet valve RMV becomes energized by a circuit extending from (+), including front contact 168 of relay CPR, wire 169, front contact 170 of relay CK, front contact 172 of relay OS, contact 173 of stepping switch SW closed for steps 4–10, wire 175, and winding of release magnet valve RMV, to (−).

After there has been an emergency application of the brakes of the locomotive, which can be effective either by failure of the locomotive to receive the carrier, or by the actuation of the emergency brake switch EB by an operator as has been described, it is necessary for the operator at the control office to actuate the brake reset button BR before the brakes may be released. The actuation of this button causes the transmission of the carrier modulated by only tone f6.

The tone frequency f6 is generated by this control by the tone generator TG, but the tone generator TG is not effective at this time to generate the other tones because of a circuit for the tone generator TG being open at contact 79 of train control switch TC, which is assumed to be in its center position at this time. According to the block diagram of the tone generator TG, frequency f6 is generated at this time in accordance with application of energy to the tone generator TG through contact 75 of emergency brake switch EB in its left-hand position (see FIG. 4B), wire 176, contact 177 of lever TC in its center position, contact 178 of dump control lever DC in its off position, normally closed contact 179 of dump execution button DE, and contact 180 of brake reset button BR in its actuated position. This energization of the tone generator TG provides for the modulation of the carrier by frequency f6 over wire 181.

The reception of the frequency f6 on the locomotive, without having conditioned the system to pick up the check relay CK, provides for the energization of the reset magnet valve RV and also for the energization of the release magnet valve RMV to permit the release of the brakes of the locomotive. The circuit for the energization of the valve RV extends from (+), including back contacts 182, 183, 184, 185, 186 and 187 of relays CK, 2M, 2L, 1H, 1M and 1L respectively, front contact 188 of relay 2H, wire 189 and winding of reset magnet valve RV, to (−). The relay CPR is in its dropped away position at this time, even though the carrier is being received, because of lack of air pressure to close the pressure contact 28 of the pressure switch PS (see FIG. 5B). As soon as the air pressure is built up to actuate the pressure switch PS, the relay CPR becomes picked up. The circuit by which the release magnet valve RMV is energized upon reception of the frequency f6 extends from (+), including back contacts 182, 183, 184, 185, 186 and 187 of relays CK, 2M, 2L, 1H, 1M and 1L respectively, front contact 191 of relay 2H, wire 192, wire 175 and winding of valve RMV, to (−).

In case the train fails to start, even though the stepper switch has been actuated progressively to increase the throttle for the power unit to maximum throttle, provision is made for automatically restoring the system to normal and providing for a service application of the brakes. This control is provided particularly by the overload relay OL (see FIG. 5C). This relay becomes picked up on the tenth step of the stepping switch SW by the energization of a circuit extending from (+), including front contact 210 of stepping switch SW (closed on the tenth step), wire 211 and winding of relay OL, to (−).

The relay OL, when picked up, opens the stick circuit normally provided for the check relay CK at back contact 60, and closes a new stick circuit for relay CK, only provided that the train is in motion as registered by the relay VDR being in its picked up position. Relay VDR is a repeater of the relay VD, which in turn is picked up in response to any voltage generated by the frequency generator FG. In other words, the energization of relay VD indicates that the train is in motion, and this condition is repeated into the relay VDR by picking up this relay through front contact 212 of relay VD. Relay VDR in picking up closes front contact 213 in the stick circuit for relay CK to condition a circuit by which relay CK can be maintained picked up, even though the overload relay OL becomes picked up. Thus, even though full power is applied, the relay CK can be maintained picked up by energy through front contact 60 of relay OL and front contact 213 of relay VDR, which circuit indicates that the locomotive is in motion. Should the locomotive fail to start under full throttle, the relay VDR does not become picked up, and thus the relay CK becomes dropped away upon the picking up of the overload relay OL. The dropping away of relay CK provides for a service application of the brakes by the energization of the application magnet valve AMV in a manner that has been heretofore described. It will be noted that the relay VDR also checks the integrity of the axle generator FG in that if this generator fails to provide an output by the time step 10 is reached, there is a service application of the brakes.

Having considered the mode of operation for the remote operation of the locomotive, and for setting the brakes, consideration will now be given to the dumping circuit organization wherein remote control is provided for the dumping of the cars into the hopper H over the conveyer belt CB (see FIG. 1). After a car is spotted by the operator at the control office over the hopper H, a dump control is designated for the car by actuation of the dump control lever DC (see FIG. 4A) to a position corresponding to the number of the car to be dumped. Having thus designated the car, the operator designates execution of the dump control by the depression of the push button DE. The depression of this push button is effective to cause the transmission of a distinctive code of tones involving the frequencies $f4$, $f5$ and $f6$ for car designation, and the frequency $f2$ is transmitted as an execution control circuit to render the dumping effective.

If car No. 1 is to be dumped, for example, the dump control lever DC is actuated to the No. 1 position, and in accordance therewith, the carrier becomes modulated by frequencies $f4$, $f5$ and $f6$. The tone generator TG is rendered effective to generate frequency $f4$ in accordance with the energization of a circuit including contact 75 of the emergency brake switch EB in its left-hand position (see FIG. 4B), wire 176, contact 177 of switch TC in its center position, normally closed contact 193 of button BR, and contact 194 of switch DC in its No. 1 position. The frequency $f4$ is applied to the carrier over wire 195. Similarly the frequency $f5$ is generated by energy feeding through contact 196 of lever DC in its No. 1 position, and the frequency $f5$ is applied to the carrier over wire 197. The frequency $f6$ is generated by a circuit including contact 198 of lever DC in its No. 1 position, and the frequency $f6$ is applied to the carrier over wire 181.

When the dump execution button DE is depressed, the frequency $f2$ is generated in accordance with energy feeding through contact 75 of switch EB in its left-hand position (see FIG. 4B), wire 176, contact 177 of switch TC in its center position, normally closed contact 193 of push button BR, contact 199 of switch DC in its No. 1 position, and contact 200 of push button DE in its depressed position. The carrier is modulated by the frequency $f2$ by a connection over wire 201.

Upon receiving the frequencies $f4$, $f5$ and $f6$ on the locomotive, the relays 2L, 2M and 2H become picked up respectively. The reception on the locomotive of the frequency $f2$ causes the picking up of relay 1M, and this conditions a circuit for the energization of the valve 1CD to render the car dumping effective for car No. 1. Valve 1CD is energized by a circuit extending from (+), including back contact 202 of relay CK, back contact 203 of relay 1L, front contact 204 of relay 1M, back contact 205 of relay 1H, front contact 206 of relay 2H, front contact 207 of relay 2L, front contact 208 of relay 2M and winding of valve 1CD, to (—). The car No. 1 remains in its dumped position as long as the valve 1CD is energized, and thus the restoration of the dump execution button DE at the control office to its normal position, removing frequency $f2$, is effective to cause the deenergization of the valve 1CD on the locomotive because of the opening of front contact 204 of relay 1M upon cessation of the frequency $f2$.

Having thus described the mode of operation upon the dumping of car No. 1, it is to be understood that a similar mode of operation is provided for the dumping of the other cars, the valves CD for the respective cars being connected in a circuit network to select a different car for each different code combination of the frequencies $f4$, $f5$ and $f6$ which are received from the control office. It will also be readily apparent that the connections are made at different points of the multiple position dump control switch DC at the control office so as to set up a distinctive code for each position of the lever DC, and thus transmit a distinctive code characteristic of each car designated to be dumped.

*Push button operation*

The automatic-manual switch AM provides for the selective control of the forward and reverse relays F1 and R1 (see FIG. 5B) and the speed relays SS1 and FS1, either in accordance with remote control as has been described, or in accordance with the manual operation of push buttons PB which are disposed on the push button control panel P on the locomotive. To consider operation in accordance with the actuation of the push buttons PB, it will be assumed that the automatic-manual switch AM is actuated from its normal position as is illustrated to its manual position M so as to render the operation of the locomotive in accordance with the actuation of the push buttons PB on the control panel P. This operation of the switch AM should be rendered effective at a time when no operating controls are designated by the remote control system, and when the neutral push button NPB is in its actuated position as is illustrated in FIG. 5B.

After the switch AM has been actuated to its position M, the forward push button FPB can be depressed, for example, for designation of a forward control, and the depression of this push button mechanically restores the neutral push button NPB to a restoration position wherein the contacts illustrated as being operated by this button become closed. Under these conditions, the check relay CK becomes picked up by the energization of a circuit including contact 236 of push button FPB in its depressed position, front contact 237 of neutral push button NPB, contact 226 of switch AM in its M position, wire 227, lower winding of relay CK, wire 228 and contact 229 of switch AM in its M position. At the same time, the forward relay F1 becomes picked up, provided the locomotive is not in motion, in accordance with the energization of the circuit for this relay extending from (+) including back contact 238 of relay VDR (see FIG. 5C), wire 239, front contact 240 of neutral push button NPB, back contact 241 of push button FPB, contact 231 of switch AM in its M position, winding of relay F1 and back contact 115 of relay R1, to (—). The picking up of relay F1 establishes a circuit to maintain the relay CK energized including front contact 242 of relay F1, front contact 237 of neutral push button NPB, contact 226 of switch AM in its M position, wire 227, lower winding of relay CK, wire 228 and contact 229 of switch AM in its M position. Relay F1 is maintained picked up by a stick circuit dependent upon the energized condition of relay CK in the same manner as has been heretofore described when considering the remote control of the locomotive.

It will be readily apparent that if a reverse control is designated rather than a forward control, the actuation of the reverse push button RPB is effective by the closure of its back contact 243 to provide energization for the relay CK, and the closure of back contact 244 of this push button is effective to cause the picking up of the reverse relay R1. The reverse relay R1, when picked up, supplies energy through its front contact 245 to maintain the relay CK picked up after the reverse push button RPB is restored to its normal position. It will be readily apparent from the mode of operation that has been described, that neither the forward control relay F1 or the reverse control relay R1 can be picked up for establishing a direction of operation of the locomotive unless the locomotive is substantially at stop because the relay VDR becomes picked up when there is output of the frequency generator FG, and the picking up of this relay prevents the energization of either relay F1 or relay R1 by the opening of back contact 238 in the pick up circuits for these relays.

Having designated the direction of operation, a designation of slow or medium speed can be made by the actuation of the slow push button SSPB or the medium speed push button FSPB. The actuation of either of these push buttons causes the restoration of the push button FPB or RPB that may have been actuated, but the restoration of either of these push buttons to its normal position does not cause the dropping away of the direction relay F1 or R1, because such relay is maintained picked up by a stick circuit as has been heretofore described. If the push button SSPB is actuated, the slow speed relay SS1 becomes picked up by the energization of a circuit extending from (+), including front contact 246 of push button NPB, back contact 247 of push button SSPB, contact 232 of switch AM in its M position, front contact 120 and back contact 121 of relays F1 and R1 respectively (if a forward direction has been designated) winding of relay SS1, wire 122 and front contact 123 of relay CK, to (—). This relay is maintained energized until designation of a neutral control by actuation of the neutral push button NPB to open its circuit at front contact 246 of this push button. The picking up of the speed relay SS1 causes the control of the throttle of the locomotive in a manner corresponding to that which has been described when considering the remote control of the locomotive.

If a medium speed control is designated by the actuation of the push button FSPB, rather than the actuation of the push button SSPB, both relays SS1 and FS1 become picked up. The relay SS1 becomes picked up by the energization of a circuit similar to that which has been described, except that the circuit is closed through back contact 248 of push button FSPB, which is connected in multiple with back contact 247 of relay SSPB. The relay FS1 is picked up under these conditions by a circuit extending from (+), including front contact 249 of push button NPB, back contact 250 of push button FSPB, contact 233 of switch AM in its M position, front contact 140 and back contact 141 of relays F1 and R1 respectively (assuming a forward direction to be designated) winding of relay FS1, wire 122 and front contact 123 of relay CK, to (—). The picking up of relays FS1 and SS1 causes the control of the throttle and brakes are required to maintain the predetermined medium speed of from ten to twelve miles per hour by actuating the stepping switch SW as required to increase or decrease the throttle, and by applying the brakes in case of an over-speed condition by the same mode of operation that has been heretofore described when considering the remote control of the locomotive.

To cancel a control that has been designated as has been heretofore described, the operator depresses the neutral push button NPB, which is effected by the opening of its contacts 237, 240, 249 and 246 to deenergize any control relays that may be in their picked up positions for causing movement of the locomotive. With the relays FS1 and SS1 both in their dropped away positions, and with the check relay CK dropped away, the brakes are applied to bring the locomotive to a stop. After the locomotive has come to a stop, the operator can switch the control of the locomotive from control by push button operation as has been described to the remote control of an operator by actuation of the automatic-manual switch AM from its M position to its A position.

Having thus described the remote and push-button control of a train for a specific loading and dumping function, it is desired to be understood that this form is presented only by illustration, and that the system provided by the present invention is readily applicable to the control of different types of trains operating under entirely different conditions, such as being used for conventional passenger or freight traffic, or for mining operations. It is to be further understood that various adaptations, alterations and modifications may be applied to the specific form of the invention shown in accordance with the requirements of practice within the scope of the appending claims.

What I claim is:

1. A remote control system for a variable speed power unit of a locomotive comprising, code transmitting means at a control point for transmitting radiated energy selectively modulated by a plurality of different tones, tone selecting means at the control point for selecting different combinations of tones for transmission in response to the designation of respective controls for the locomotive, code receiving means on the locomotive for receiving the tones communicated from the control point, said code receiving means being distinctively conditioned in response to the respective tones received, stepping means on the locomotive initiated upon reception of a particular combination of tones for progressively causing an increase in the speed of said power unit step by step at predetermined timed intervals, and speed registration means for limiting the stepping of said stepping means in accordance with the actual speed of the locomotive.

2. A remote control system according to claim 1 wherein integrity checking means is provided to check the ability of receiving apparatus on the locomotive to receive all of the tones before such receiving apparatus can be operable in response to a proceed control code.

3. A remote control system according to claim 1 wherein the stepping means includes a stepping switch.

4. A remote control system according to claim 1 wherein the stepping means is operable selectively to step up or step down, one step at a time, and to increase or decrease the speed of the power unit accordingly.

5. A remote control system according to claim 1 wherein the speed registration means is carried on the locomotive.

6. A remote control system for a variable speed power unit of a locomotive comprising, code transmitting means at a control point for transmitting radiated energy selectively modulated by a plurality of different tones, tone selecting means at the control point for selecting different combinations of tones for transmission in accordance with the designation of respective controls for the locomotive, code receiving means on the locomotive for receiving the tones communicated from the control point, said code receiving means being distinctively conditioned in response to the different code combinations of tones received, stepping means including a stepping switch on the locomotive initiated in response to the reception of a forward or a reverse control for progressively causing an increase in the speed of said driving power unit step by step at predetermined timed intervals, and vehicle carried means for limiting the stepping of said stepping means in accordance with the actual speed of the locomotive.

7. A remote control system according to claim 6 wherein the stepping means includes step up and step down relays for respectively actuating said stepping switch step by step in selected opposite directions.

8. A remote control system according to claim 6 wherein the rate of stepping is determined by a time constant circuit including a capacitor.

9. A remote control system according to claim 6 wherein circuit means is provided for operation of the step up and step down relays including a contact opened at the time each step is taken.

10. A remote control system according to claim 6 wherein overload means is provided for applying the brakes of the locomotive if the locomotive fails to start.

11. A remote control system according to claim 10 wherein the overload means is rendered effective only after the stepping of said stepping switch has progressed to a predetermined step.

12. A remote control system for the remote control by a code communication system of a power unit on a locomotive comprising, a plurality of tone generators at a control office code transmitting means at the control office for transmitting radiated energy selectively modulated by a plurality of different tones generated by said tone generator respectively, manually operable means at the control office for designation of a control code of tones less than the total number of said tone generators for transmission to initiate operation of the power unit, integrity checking means for checking the integrity of the code communication system to communicate said code, said integrity checking means including means at the control office responsive to the actuation of said manually operable means to designate said control code for momentarily intially transmitting tones generated by all of said generators and then momentarily removing all tones before the transmission of said selected code of tones, said integrity check means including receiving means on the locomotive distinctively responsive to the code transmitted from the control office for initiating operation of said power unit only provided that tones of all of the generators are received initially and all tones are subsequently removed initially before the reception of said code can be rendered effective to control the power unit.

13. A remote control system according to claim 12 wherein the integrity checking means includes a normally deenergized check relay.

14. A remote control system according to claim 13 wherein the check relay is picked up by the discharge of a capacitor, and means is provided to charge the capacitor only provided that all tones are simultaneously received.

15. A remote control system according to claim 14 wherein circuit means is provided for picking up said check relay by the discharge of said capacitor only at a time when no tones are being received.

16. A remote control system according to claim 15 wherein circuit means is provided for picking up said check relay by the discharge of said capacitor only at a time when no tones and no carrier energy is being received.

17. A system for governing the operation of a control throttle of a vehicle comprising:
 (a) a first means on the vehicle for registering a selected desired speed of a plurality of possible speeds for said vehicle,
 (b) second means on the vehicle for generating an analog of the actual speed of the vehicle,
 (c) comparator means controlled by said first means and said second means for registering when the actual speed of the vehicle reaches said selected speed, and
 (d) throttle control means controlled by said comparator means for advancing said throttle at a predetermined rate only until said comparator registers that the vehicle has reached said desired speed,
 (e) said throttle control means comprising stepping means for selectively advancing or retarding the throttle as controlled by said comparator means.

18. A system for governing the operation of a vehicle along a right of way comprising:
 (a) code communication apparatus partly along the right of way and partly on the vehicle for selecting a desired speed for the vehicle,
 (b) manually operable control buttons on the vehicle also operable for selecting said desired speed,
 (c) first means for registering a selected desired speed in response to either said code communication apparatus or said manually operable apparatus,
 (d) second means for generating an alternating current having a frequency variable in accordance with the speed of the vehicle,
 (e) comparator means controlled by said first means and said second means and including one of a plurality of band pass filters selected by said first means for determining when the vehicle has reached said desired speed in accordance with whether or not the generated alternating frequency will pass through said selected filter.
 (f) direction control means on the vehicle controlled by said code communication apparatus or said control buttons for governing the direction for operation of the vehicle, and
 (g) stepping means responsive to the registration of said desired speed on said vehicle for controlling the throttle and brakes of the vehicle to maintain said desired speed by stepping up or stepping down as the speed of the vehicle tends to go below or above the desired speed respectively as determined by said comparator means,
 (h) said stepping means being controlled by said comparator means to cease stepping when the vehicle is traveling at said selected speed.

No references cited.

ARTHUR L. LA POINT, *Primary Examiner.*